(12) United States Patent
Shimoda et al.

(10) Patent No.: US 7,697,824 B2
(45) Date of Patent: Apr. 13, 2010

(54) RECORDING AND PLAYBACK APPARATUS

(75) Inventors: Nozomu Shimoda, Ninimiya (JP); Naozumi Sugimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1266 days.

(21) Appl. No.: 11/056,435

(22) Filed: Feb. 10, 2005

(65) Prior Publication Data

US 2005/0259976 A1     Nov. 24, 2005

(51) Int. Cl.
    H04N 5/00     (2006.01)

(52) U.S. Cl. .................. 386/125; 386/46; 386/95; 386/126

(58) Field of Classification Search ......... 386/125, 386/126, 46, 95
    See application file for complete search history.

(56) References Cited

U.S. PATENT DOCUMENTS

| 6,999,999 | B2 | 2/2006 | Camble et al. | |
| 2002/0016643 | A1 | 2/2002 | Sakata | |
| 2004/0126089 | A1* | 7/2004 | Suzuki | 386/46 |
| 2004/0158738 | A1* | 8/2004 | Tanaka | 713/200 |
| 2005/0257250 | A1* | 11/2005 | Mitchell et al. | 726/3 |

FOREIGN PATENT DOCUMENTS

| JP | 08-328846 A | 12/1996 |
| JP | 10-304195 A | 11/1998 |
| JP | 11-317991 A | 11/1999 |
| JP | 2001-325786 A | 11/2001 |
| JP | 2002-197804 A | 7/2002 |
| JP | 2002-218372 A | 8/2002 |
| JP | 2003-248610 A | 9/2003 |

OTHER PUBLICATIONS

Kim et al. "How is a program stored on Blu-ray Disc?" Nikkei Electronics (Jul. 2003), abstract only.
Japan Patent Office office action for patent application JP2004-138006 (Oct. 20, 2008).
Japan Patent Office office action for patent application JP2004-138006 (Jan. 21, 2009).

* cited by examiner

*Primary Examiner*—Thai Tran
*Assistant Examiner*—Girumsew Wendmagegn
(74) *Attorney, Agent, or Firm*—Townsend and Townsend and Crew LLP

(57) ABSTRACT

So far, consumer AV equipment were not designed to ensure good usability for all users because operations of such equipment become complicated as a result of sophistication and diversification of their functions, or such equipment are provided with functions that can be used only by part of users. In this connection, a recording and playback apparatus is configured such that an expanded function control module which controls GUI functions or network connections is provided to enable a user to choose use conditions of the expanded functions and easily switch over operations of the expanded functions according to such use conditions. Thus, usability is improved.

14 Claims, 9 Drawing Sheets

RECORDING AND PLAYBACK APPARATUS

CROSS-REFERENCES TO RELATED APPLICATIONS

The present application is related to and claims priority from Japanese Patent Application No. 2004-138006, filed May 7, 2004, and is hereby incorporated by reference for all purposes.

BACKGROUND OF THE INVENTION

The present invention relates to a recording and playback apparatus having not only functions to record and play back audio and video information, but also expanded functions such as the Graphical User Interface (GUI) to display windows or icons by means of software and move animation. More specifically, the invention relates to a recording and playback apparatus which is configured so that a user can individually set up the above-stated expanded functions by means of software.

In recent years, optical disks represented by, as we say, DVDs have been widely prevalent. High-quality audio and video information can be recorded on those optical disks, and further, quality of such high-quality audio and video information will hardly be deteriorated even if they are stored for a long period of time. As a result, recording and playback apparatuses (including DVD players and DVD recorders, for example) which enable easy recording and playback of high-quality audio and video information at home have been rapidly disseminated.

In particular, recording and playback apparatuses have become sophisticated and the broadband environment has been rapidly developed in recent years, and, for example, new services for home page browsing by connecting such recording and playback apparatuses to networks, or downloading of contents such as movies and games are being proposed.

In addition, other than the above, it is expected that equipment which describes functions and operating procedures for users by displaying icons, animations, windows, etc. on a display through enhanced GUI functions will be continuously on the increase in the future.

When such functions is realized, what will become effective is the execution environment of general-purpose software as is represented by JAVA™. The reason for this is that the use of such software execution environment eliminates the need for developing software for respective equipment, and the software once developed is executable in any equipment.

In this connection, the use of such software execution environment enables to expand the GUI functions even with consumer AV equipment. In addition, connection to the Internet or to other network equipment becomes easy.

Such functions, however, are not inherent in AV equipment, but they are a kind of expanded functions. Such expanded functions are very convenient for users and offer an effect of doubling their comfort. On the other hand, many users feel uneasy when faced with complicated screen operations due to excessive GUI functions and slow screen display of such functions. Further, the network connection will cause a problem of increased risk of virus infection. In particular, virus infection through networks has become a widespread issue, and technologies to prevent virus infection have been proposed (Refer to Japanese Patent Laid-open No. 8-328846, for example).

Furthermore, AV equipment in recent years continues to feature more and more versatile functions. However, some of the functions are not necessary for users and some are inadequate since they are used for crimes, and technologies which set the functions to be restricted have been proposed (Refer to Japanese Patent Laid-open No. 10-304195, for example).

In the future, for consumer AV equipment including recording and playback apparatuses, not only sophisticated and versatile functions, but also technologies to enhance usability and security will be demanded.

Conventionally, such consumer AV equipment as DVD players have been demanded for their easy functionality, for example, like TVs and VCRs, by a wide generation of people ranging from elderly people to children without exerting special knowledge or skills.

On the other hand, in recent years, AV equipment has become more sophisticated. As a result, they are capable of not only offering conventional functions for recording or playback of audio and video information, but also linking with other network equipment, browsing WEB pages or downloading contents via networks, for example.

However, only some of the users can master such sophisticated functions and frequently many people feel operations are difficult or they recognize such functions as unnecessary ones. In this connection, AV equipment is devised so as to give clear and detailed explanation on operations and functions to those who have no special knowledge about the equipment, by skillfully utilizing GUI functions including animations and windows.

However, such devices may sometimes make GUI functions more complicated, which makes some of the users feel cumbersome and complicated, or the processing time of GUI functions forces users to wait for the process to complete, thus frustrating the users.

In addition, as compared to PCs in which various security measures are taken assuming their connection to networks, AV equipment is not provided with adequate security measures in terms of network connections. Further, AV equipment users have poor information on networks and poorly aware of the risk of computer virus infection. As a result, it is expected that there will be a greater risk of computer virus infection, thus causing social problems.

BRIEF SUMMARY OF THE INVENTION

The present invention can provide, in the next generation of highly functional AV equipment represented by DVD players which offers enhanced GUI functions and is connectable to networks, a recording and playback apparatus which is capable of easily enhancing functionality and security levels, enabling users to optionally choose and set functions to be used according to service conditions such as their preferences, applications and levels of knowledge on AV equipment or networks.

In response to the above-stated problems, there is provided a recording and playback apparatus according to an aspect of the present invention including: a read module to read audio and video information recorded on a disk; an output module to display the audio and video information read by the read module on a display module; a control module to display a window including expanded functions of the audio and video information on the display module; and a selection module which enables a user to choose which expanded function, and the control module displays the windows including the expanded functions on the display module via the output module.

With the recording and playback apparatus of the aspect of the present invention, it is possible for a user to set up use conditions that are user-friendly through easy procedures, thus offering an effect of enhancing usability.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

Hereinafter, preferred embodiments of a recording and playback apparatus according to the present invention will be described by exemplifying a DVD recorder with reference to the drawings.

Figure 1:
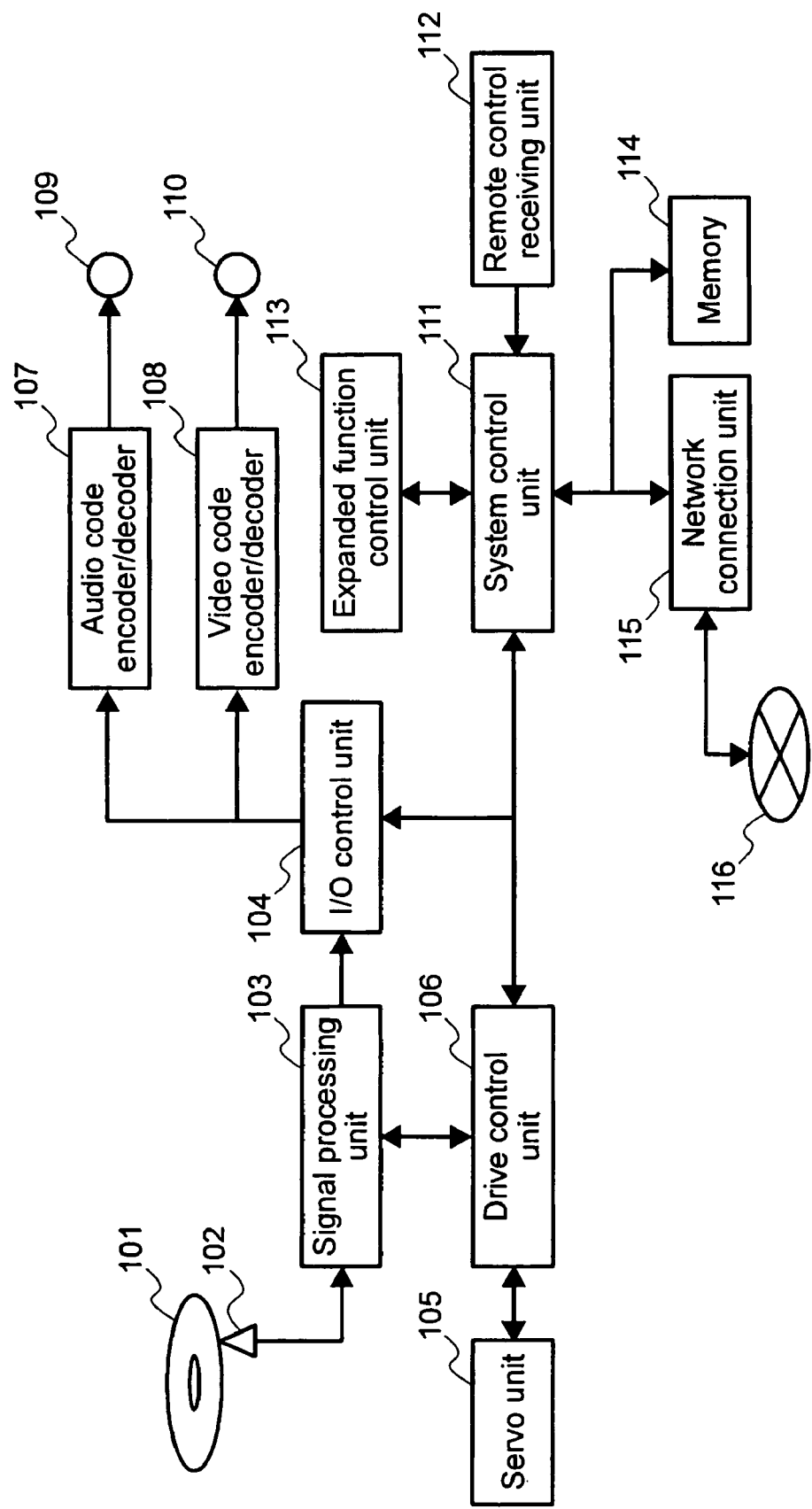
FIG. 1 is a block diagram of a recording and playback apparatus.

FIG. 1 shows a block diagram of a recording and playback apparatus according to a preferred embodiment. Reference numeral 101 denotes an optical disk; 102 an optical pickup which reads a signal from the optical disk; 103 a signal processing unit which subjects the signal from the optical disk to encoding/decoding processes to record and playback data; 104 an I/O control unit which controls input/output timing of data during recording and playback; 105 a servo unit which controls rotation speeds of the optical disk, the position of an optical pickup, and a distance between the optical disk and the optical pickup; 106 a drive control unit which controls the servo unit and the signal processing unit; 107 an audio code encoder and decoder which encodes and decodes an audio signal; 108 a video code encoder/decoder which encodes and decodes a video signal; 109 an audio I/O terminal which receives a pre-encoding audio signal, and outputs a post-decoding audio signal; 110 a video I/O terminal which receives a pre-encoding video signal, and outputs a post-decoding video signal; 111 a system control unit which controls the whole recording and playback apparatus; 112 a remote control receiving unit which receives a signal from a remote controller; 113 an expanded function control unit which mainly controls an expanded function such as GUI and network connections; 114 a memory, 115 a network connection unit which enables connections with external networks; and 116 a network.

First, in the recording and playback apparatus of the embodiment, a method of allowing the user to play back audio and video information recorded on an optical disk will be described. The user turns on the recording and playback apparatus, and inserts an optical disk 101 thereto. A system control unit 111 in the recording and playback apparatus recognizes that the optical disk has been inserted and reads management information on the optical disk. The management information is recorded in a predefined location on the optical disk based on a file management system typified by the Universal Disc Format (UDF), for example. In the file management information, names of files recorded on the optical disk, recording start positions, file sizes, other additional information, etc. are written.

The system control unit 111, after reading the above-stated file management information, starts preparation for playback of the optical disk 101. More specifically, the system control unit 111 reads a file among files recorded on the optical disk, which is required for playback, and analyzes the file. Here, the optical disk 101 has files, for example, shown in FIG. 2 recorded thereon.

Figure 2:
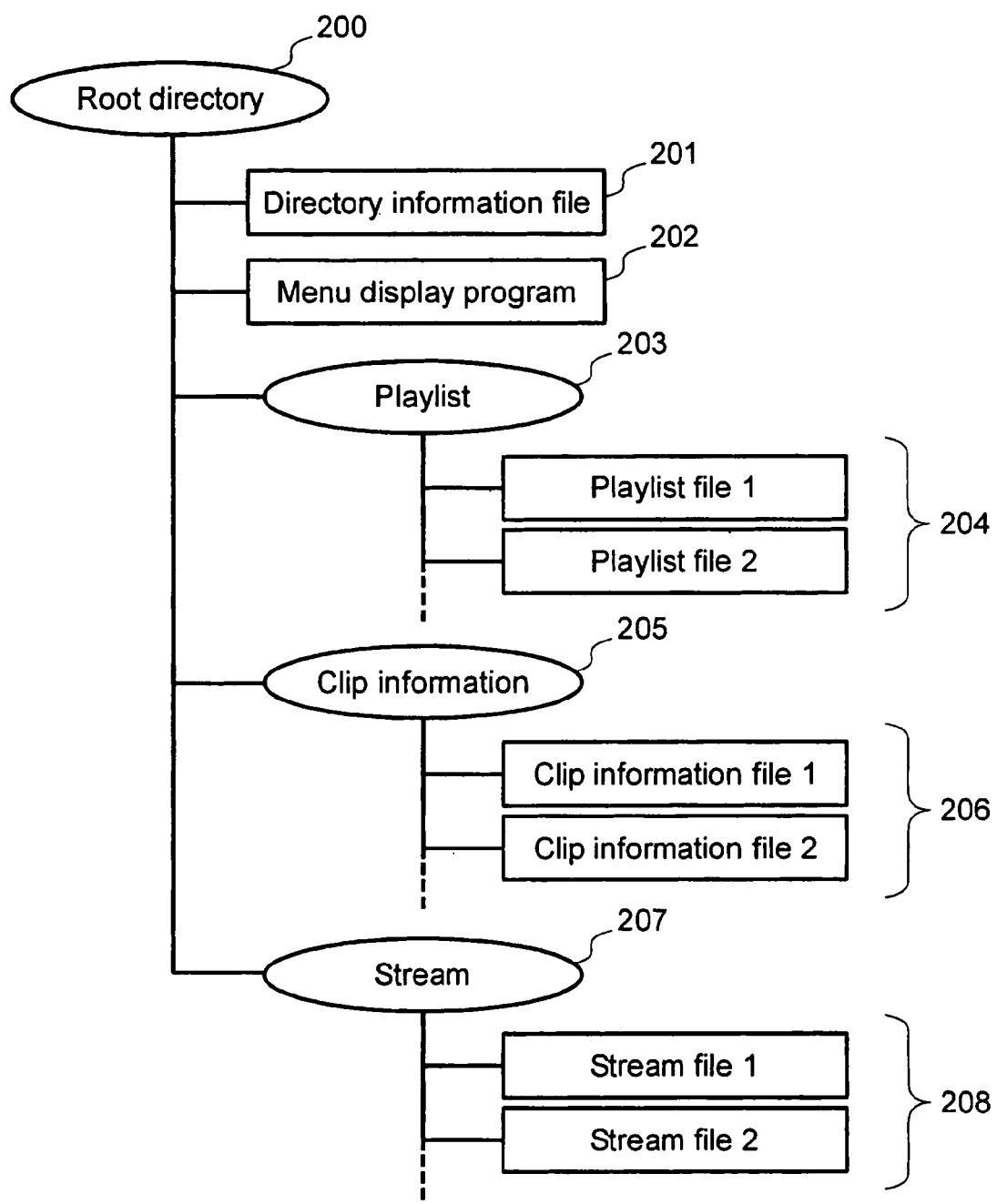
FIG. 2 illustrates a directory configuration on an optical disk.

Referring to FIG. 2, reference numeral 200 is a root directory, 201 a directory information file in which information such as file names the number of playlists available in the root directory, and 202 a menu display program in which a program to display menu is recorded. Reference numeral 203 is a playlist directory, and it stores a plurality of playlist files in which information such as playback positions and orders of images are recorded. Reference numeral 205 is a clip information directory, and, as indicated by reference numeral 206, it stores a plurality of clip information files in which information such as playback start positions of stream files, and packet positions. Reference numeral 207 is a stream directory, and, as indicated by reference numeral 208, it stores a plurality of stream files in which information such as image and audio is recorded.

Hereinafter, the stream file 208 will be described. Image information in the stream file 208 is recorded in the MPEG-2 TS (Transport Stream) format, which is one of the image information compression techniques. Here, a description will be made by taking the MPEG-2 as an example. However, the image information of streams may be recorded by using other image compression techniques. In addition, audio information is also compressed by using audio compression techniques such as the MPEG-1 audio, Advanced Audio Codec (AAC) format or Linear Pulse Code Modulation (PCM) format, and the compression technique to be used for this purpose is not limited in particular. Here, the above-stated audio and video information is multiplexed into the TS format for the purpose of facilitating transmission or storage thereof. At this time, by adding a packet ID that is unique to individual packet, it is possible to facilitate separation of packets at the time of playback. In addition, with the TS format, it is possible to multiplex various information packets such as graphical information and control commands in addition to audio and video information.

Next, the clip information file 206 will be described. As described in the above, image information is recorded in the MPEG-2 format. With the MPEG-2 format, in general, compression is executed on a set of consecutive 15 images. The set of images is referred to as Group of Pictures (GOP), and, image can be played back when playback is executed starting from the top of the GOP.

In the clip information file, information on the packet position of the leading end of the GOP, information that is required for special playback such as fast forwarding and rewind, etc. will be written. In addition, the clip information file associates one to one with the above-stated TS file. For example, by recording clip information file 1 in association with stream file 1, it is possible to easily identify the association between the two files.

Next, the playlist file 204 will be described. A playlist file is a file in which information that sets down playback order of TS files is recorded. In a playlist file, information on a file identifier of the stream file to be played back, playback start time, playback end time, etc. are recorded. At the time of playback, stream files will be played back in sequence according to the information recorded in the specified playlist file.

At the time of starting playback, the menu display program 202 will be executed first according to the instruction from the expanded function control unit 113. The menu display program is a program that mainly manages the GUI functions and displays the menu window used for choosing content recorded on an optical disk and executing various setups. When the program is executed, a content selection window as shown in FIG. 3, for example, will be displayed.

Figure 3:
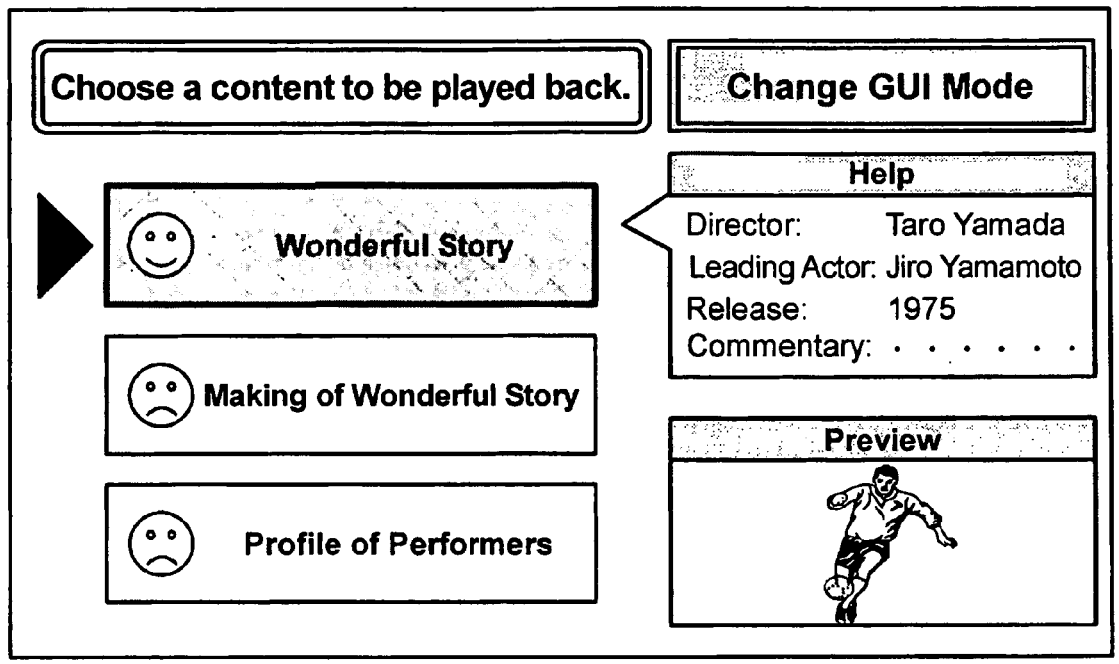
FIG. 3 illustrates an example of a playback menu window using GUI.

FIG. 3 illustrates an example of a menu window on which content to be played back is chosen. Playback of content starts when a user moves the cursor key up and down to choose the desired content and presses the OK button. At this time, the menu display program 202 incorporates an animation control program, a window control program and a program to control simple audio and video information.

By using the program, it is possible to enhance GUI functions of the menu window exemplified in FIG. 3. Here, the program is referred to as a GUI-compatible menu window display program. For example, at the time of choosing content to be played back, when the user points the cursor to certain content, an animation will be activated and, for the content chosen, the character's face changes into a smile. That is, emotions such as delight, anger, sorrow and pleasure can be expressed. Other than the above, it is possible to display a help window which is used to display additional information of the content chosen. It is also possible to display a preview window which associates with the content chosen, and, on the window, it is possible to play back part of the content chosen.

Such GUI-compatible menu window display program should be incorporated in the optical disk 101, and a content provider will create it individually according to types of content. In this case, if various programs are created in advance based on the predetermined rule, the recording and playback apparatus can execute the programs for versatile purposes even if the optical disk to be played back is replaced. The rule for creating the program described herein refers to programming languages, for example, and, what is needed for the recording and playback apparatus is just to prepare the environment to execute the program. The program execution environment in the present invention is the expanded function control unit 113. Here, it should be noted that the menu window shown in FIG. 3 is very complicated due to enhanced GUI functions.

Figure 4:
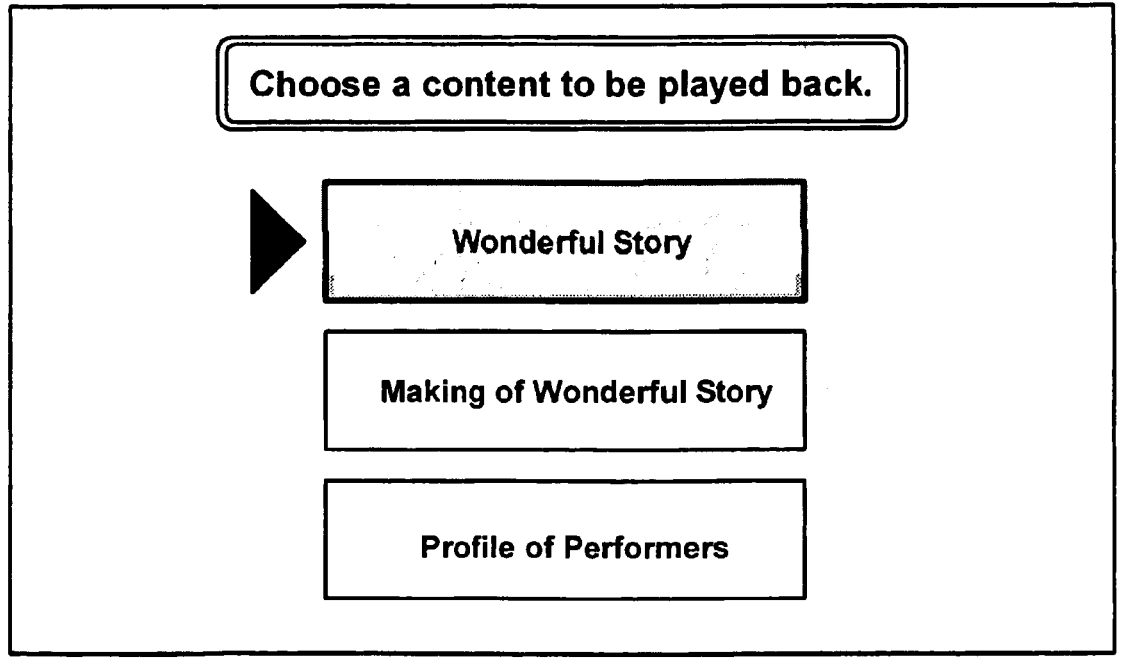
FIG. 4 illustrates an example of a playback menu window when an optical disk that is not GUI compatible.

The menu window shown in FIG. 4 is an example of a menu window for the case wherein an optical disk which does not incorporate the GUI-compatible menu window display program is played back with a recording and playback apparatus which does not have the execution environment of the above-stated program. Since both of the optical disk and the recording and playback apparatus are not compatible with the GUI-compatible menu window display program, the menu window does not have complicated GUI displays such as animation and windows, and thus constituting a simple window that is mostly configured with text. This is obvious at a glance when comparing windows shown in FIGS. 3 and 4.

At this time, respective windows shown in FIGS. 3 and 4 have an advantage and a disadvantage, and the opinions of users regarding how they evaluate those windows are different from one another among the users.

An advantage of the menu window shown in FIG. 3 is that, by using a GUI, information on content can be displayed in an understandable manner to users. It will be a great help for a user to choose content that they want to view since they can check information concerning the content through the help window or the preview window. In addition, animation and window display have an effect that even small children or elderly people who are not accustomed to operating AV equipment will be kindly guided for subsequent operations.

A disadvantage of the menu window shown in FIG. 3 is that, since a plurality of animations, text or windows will be displayed, and sometimes, audio and video information are also played back, it takes time before starting display or playback, or it also takes time for performing simple processing such as cursor operations.

In addition, the GUI as shown in FIG. 3 is necessary, for example, for a user who is going to view the optical disk for the first time and offers a significant effect. However, the GUI is not necessary for those users who have viewed the disk repeatedly, and a little effect is expected. Further, the users will be stressed since longer processing time is required as stated in the above.

On the other hand, the advantage of the menu window shown in FIG. 4 is that information display is limited to necessary and sufficient information regarding content to be played back, no excessive GUI is not provided, and therefore, time required before starting display is short and thus response to user operations is good. In addition, for users who have repeatedly viewed the optical disk, no further information is required except those shown in FIG. 4.

As for the disadvantage of the menu window shown in FIG. 4, since information on content to be played back is limited, a person who is going to view the optical disk for the first time or a person who has forgotten the content of the disk when viewing it after a long interval cannot get an idea of the content before starting playback of the content.

As described in the above, FIGS. 3 and 4 each have the advantage and disadvantage. In this connection, the embodiment is configured so that a user can choose, with simple operations, whether the user will use GUI functions or not, and if the user will use them, the user can determine to what extent the functions are used. Further the user can set up his or her GUI environment according to the user's preferences or use conditions. More specifically, at the time of displaying the menu window, steps to enable the user to choose the GUI environment are provided so that the user can choose which GUI environment will be used. Here, the term "choosing the GUI environment" implies that several options are prepared in advance, including a GUI environment in which GUI functions are most enriched, for example, as shown in the example in FIG. 3; a simple GUI environment, as shown in the example in FIG. 4, in which part of GUI functions are deleted from the example in FIG. 3; and another environment in which GUI is not used at all, and the user will choose his or her favorite GUI environment among the above-stated options. It should be noted that, the case where GUI is not used at all becomes necessary when the user wishes to totally disable the menu window display. In this case, since the menu window will not be displayed, the content will be immediately played back.

Figure 5:
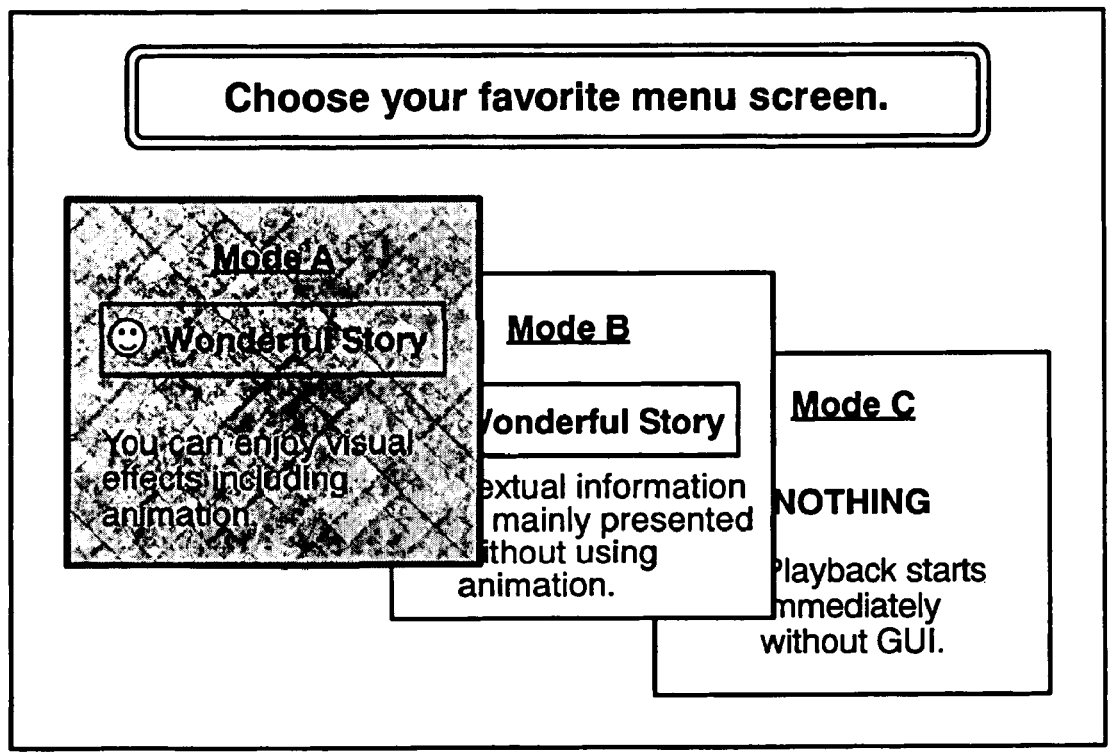
FIG. 5 illustrates an example of GUI environment selection window.

FIG. 5 shows an example of a GUI environment selection window. The example shown in FIG. 5 shows a case where the user chooses a favorite preference among three types of GUI environment prepared in advance.

Hereinafter, the setting up of the GUI environment will be described. Here, to simplify the explanation, a case wherein the GUI environment is chosen from two options—i.e., whether the GUI functions are used or not used—will be discussed.

The recording and playback apparatus according to the embodiment is provided with the expanded function control unit 113. The expanded function control unit 113 executes processes to read GUI environment setting information from a specified location when operations such as starting playback are performed, and provide a GUI environment based on the information.

Figure 6:
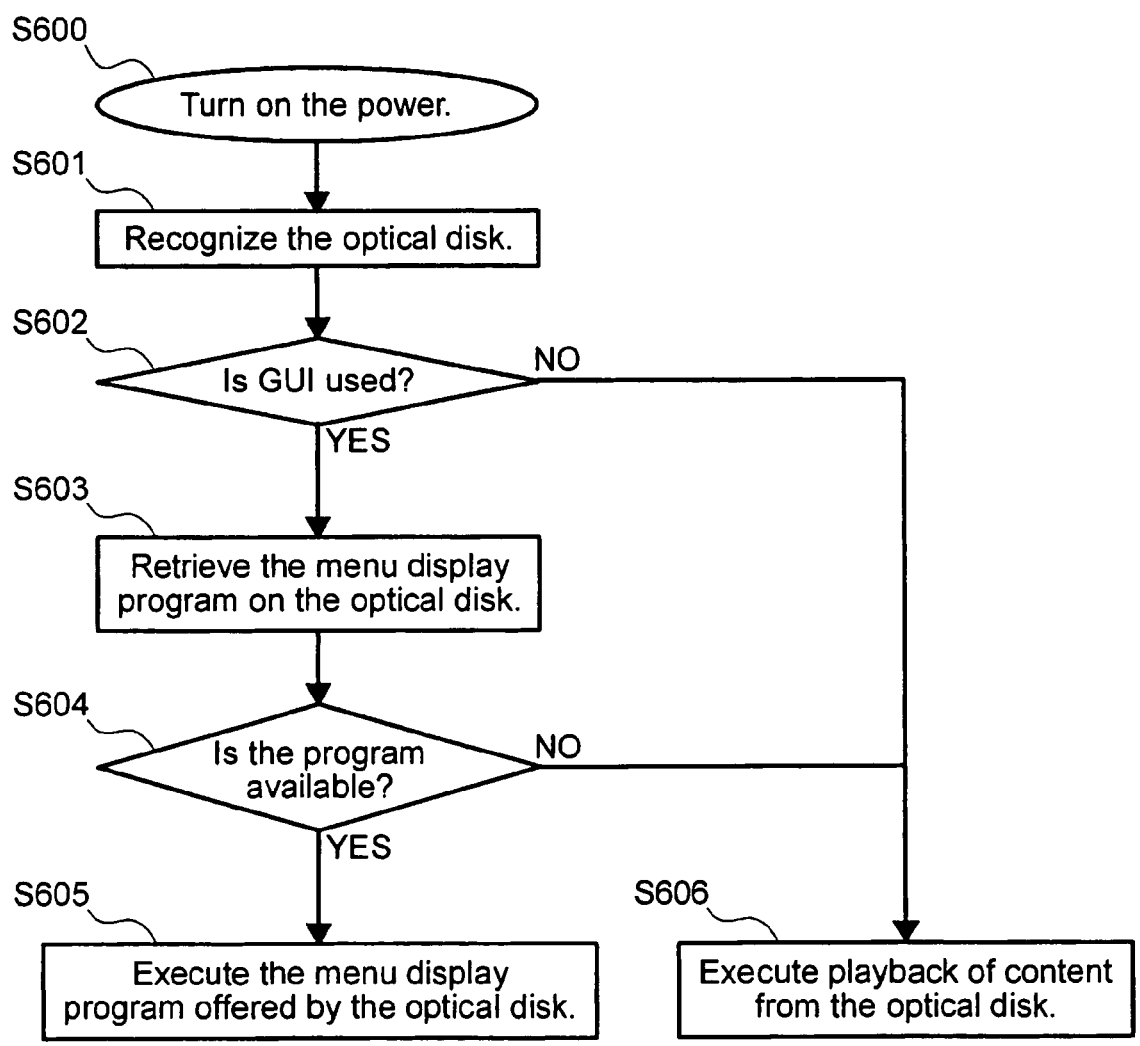
FIG. 6 is a flow chart for executing a playback menu display program.

FIG. 6 shows a flow to process the GUI environment setting in the expanded function control unit 113. The recording and playback apparatus is turned on in Step S600, and then a process to recognize that an optical disk is inserted in the apparatus is executed in Step S601.

Next, in Step S602, a judgment is made as to whether the GUI functions are used or not. Here, the judgment as to whether the GUI functions are used or not shall be conducted based on a GUI environment setting information file. The GUI environment setting information file implies a file in which setting information of GUI environment set up by a user is written and the file is stored in the memory 114. Details of the GUI environment setting information file will be described later.

When the judgment made in Step S602 is to use the GUI functions, a menu display program on the optical disk will be retrieved in Step S603. In other words, the process is a step to judge whether the optical disk thus inserted supports the GUI functions or not, or the provider of the optical disk has provided their original menu window or not. In Step S604, the retrieval of Step S603 revealed that the menu display program exists on the optical disk, or more specifically, if the menu window that is unique to the optical disk is provided, the process will proceed to Step S605 where the menu display program provided on the optical disk is executed.

On the other hand, in Step S602, if the GUI functions are not used, the process will proceed to Step S606 where playback of the content is started. Further, in Step S604, for the case where the menu display program does not exist on the optical disk, the process will also proceed to Step S606 to start playback of the content. Such a situation could occur in the case where a user wants to use GUI functions, but the optical disk inserted by the user does not support the GUI functions. This situation can occur if the content provider decides to create an optical disk which does not support GUI functions and just intends for the user to play back audio and video information, for reasons such as cost reduction. Alternatively, the situation can occur in "legacy" optical disks manufactured before the technologies of recording and playback apparatuses that support GUI functions became commercially available to the consumer market.

In this case, since the user wishes to use the GUI functions, the recording and playback apparatus will be very user-friendly when it is configured so that the apparatus is provided with its own menu window and a program to display the menu window can be executed. With the process as stated in the above, it is possible to display a menu window in the manner as set up by a user. In addition, when a flag to indicate if an optical disk supports GUI functions or not, or if the provider of the optical disk provides their original menu window or not is arranged at a specified location on the optical disk, it is possible to simplify the process of Step S603.

Here, the flag stated in the above implies bit information such as, for example, "1" for a case where an optical disk supports GUI functions, or "0" for a case where it does not support GUI functions. The recording and playback apparatus refers to the bit information, in Step S603, and switches over the process according to the bit information. This can make the process simpler compared with the case of retrieving the program. From the viewpoint of a user, since the time required for the recording and playback apparatus to retrieve the menu window display program from an optical disk can be reduced, the user can have an advantage that the time waiting for the retrieval process can be shortened.

Further, when three or more setups are available for the GUI environment, it may be so configured that in Step S602, for example, a judgment is made as to which GUI environment will be used and the process is switched over according to the GUI environment thus chosen. Here, the GUI environment setting file will be described. The GUI environment setting file is a file in which setting information of GUI environment set up by a user is written. The recording and playback apparatus of the embodiment can set up the GUI environment in details based on the information written in the GUI environment setting file.

Figure 7:
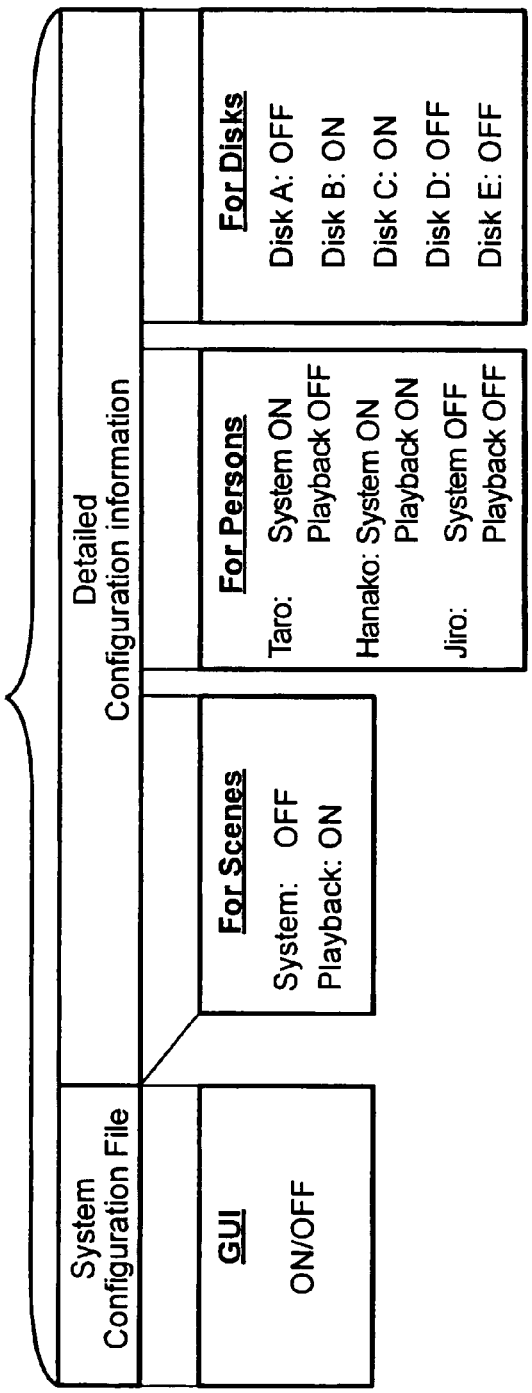
FIG. 7 illustrates an example of GUI environment setting information file.

FIG. 7 shows an example of a GUI environment setting information file. An example of the GUI environment setting information file shown in FIG. 7 mainly comprises two types of information. One is the system configuration information, and the other is the detailed configuration information.

The system configuration information implies the configuration information of a GUI environment over the entire recording and playback apparatus. In this example, information on whether the GUI information is used or not, or more specifically, information on ON/OFF of GUI functions is written. The information should affect the entire recording and playback apparatus. A step of referencing to the system configuration information is performed in Step S602, and, if the information is set to OFF as a result of such referencing, any of the GUI functions will not be used.

On the other hand, if the information is set to ON, it is possible to perform a setting operation to further enhance the usability by referring to the detailed configuration information. In the detailed configuration information, setting information for each scene, for each user and for each disk is written, for example.

To begin with, the setting information for each scene is the GUI function setting information for each scene such as the system menu window or playback menu window. Referring to the example in FIG. 7, it is set that GUI functions are not used on the system menu window, but they are used on the playback menu window.

Next, the setting information for each user is information that the setting information for each scene stated in the above is stored according to users. For example, for a case where a unit of recording and playback apparatus is shared among three family members, if the GUI environment setting can be performed according to an individual member, further usability can be expected, since a frequency, an intended purpose, an operating method of the apparatus, and a degree of proficiency in terms of functions are different among the users. Referring to the example in FIG. 7, the GUI functions are set to OFF, avoiding complicating the playback menu, since Taro frequently plays back disks. However, since Taro does not well-acquainted with other functions, the GUI functions are set to ON on the system menu to get the most out of information that can be obtained from the GUI functions. In addition, since Hanako is not accustomed to operations of the recording and playback apparatus, the GUI functions are set to ON at all times. Further, since Jiro uses the recording and playback apparatus frequently and fully understands the functions and operations, the GUI functions are set to ON at all times. As described in the above, it is possible to set the GUI environment individually among family members.

Further, at this time, IDs and passwords are used to discriminate the users, and, by associating and recording such information and the users' GUI setting information, it is possible to read or update the information easily and securely. It should be noted that authorization by using user IDs or passwords may be configured to be executed right after turning on the apparatus, and the ID or the password of each user may be stored in the memory 114.

Next, setting information for each disk implies GUI setting information on the playback menu of an optical disk that was once inserted to the recording and playback apparatus in the past. For example, for a disk which has been repeatedly viewed and the content has been fully understood, the GUI functions will be set to OFF, and, for a disk for which requires additional information is required by using GUI functions because the disk has not been viewed only several times will be set to ON. At this time, for discrimination of the disk, information unique to the disk called the Burst Cutting Area (BCA), which is recorded in the data recording area, such as the serial number of the disk, for example, may be used. In addition, the information unique to the disk is recorded after associating the information with the GUI setting information. The setting information for each disk may be stored by associating the information with the individual user setting information stated in the above. In playing back a certain disk, further detailed setting can be enabled by storing the GUI setting information in association with the ID or the password of each family member, in such a manner that, for example, Taro will set the GUI functions of the playback menu to OFF, and Hanako will set them to ON is possible, thus improving usability.

In addition, the case of turning ON/OFF the GUI functions is exemplified in FIG. 7. However, apart from the above-stated case where only two options for ON and OFF of the GUI functions, there will be such a case where three or more options are available including, for example, the GUI environment, as Mode A, in which the GUI functions are most enriched, the simple GUI environment, as Mode B, in which part of the GUI functions is not used, and the GUI environment, as Mode C, in which GUI functions are not used at all. For such a case, when information regarding which mode will be used is stored, furthermore detailed setting is possible, thus further improving usability.

Figure 8:
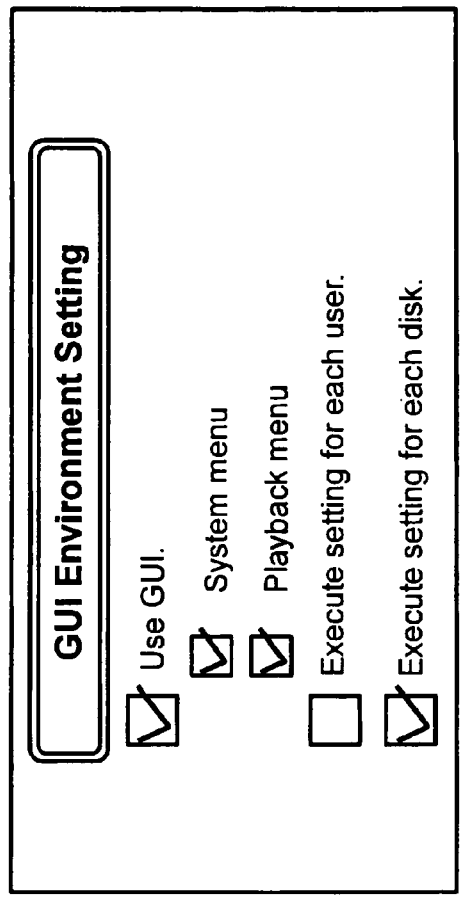
FIG. 8 illustrates an example of GUI environment setting window.
Figure 9:
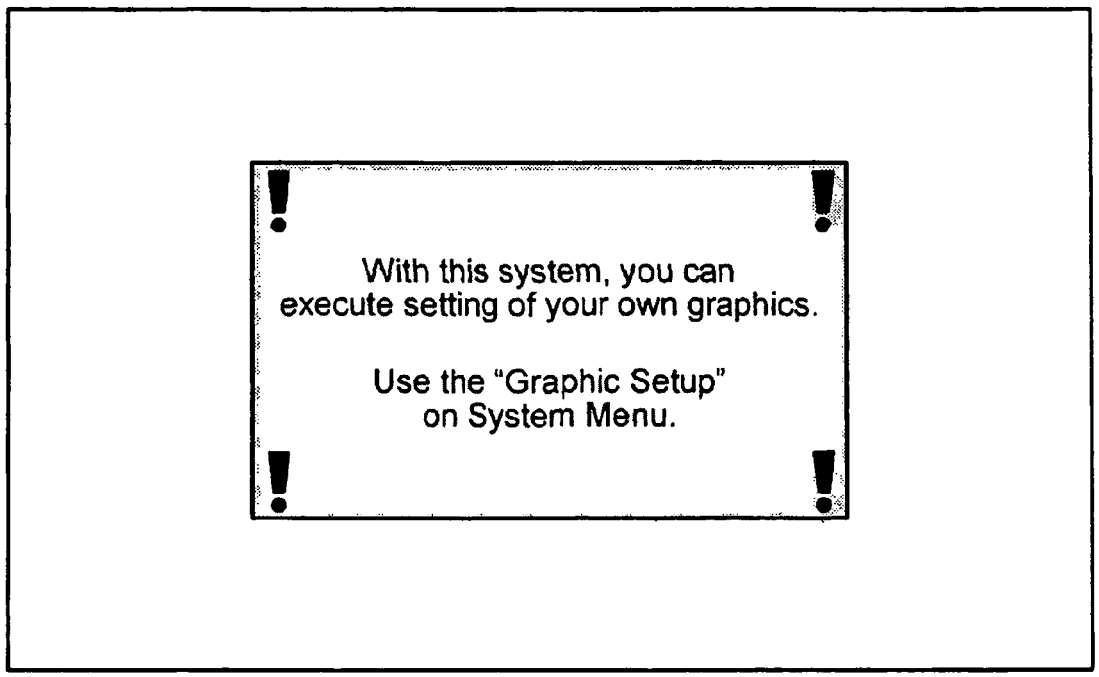
FIG. 9 illustrates an example of a dialog to prompt GUI environment setting.

Next, a method for setting the GUI environment setting information file will be described. The GUI environment is set on a window, for example, shown in FIG. 8. In the example shown in FIG. 8, a user can set his or her favorite GUI environment by ticking the box of the item for which the user want to use GUI functions. Such GUI environment setting menu can be configured so that, by providing, for example, an item such as "Graphic Setup" on the system menu of the recording and playback apparatus, setting can be performed from that menu. Further, if the recording and playback apparatus is not used right after purchase, it may be arranged to automatically start up the setting window when the power is turned on for the first time. However, the method is not limited to such arrangement. For example, another method could be conceivable wherein a dialog as shown in FIG. 9 is displayed to prompt the user for setups.

Further, as a variation of the method for setting the GUI environment setting information file, an arrangement could be conceivable wherein the GUI environment, or, so to speak GUI modes, is switched over while the system menu or the playback menu is displayed. For example, when it is so configured that setting of which GUI mode will be used for the playback menu of a disk can be conducted from the playback menu, and not from the system menu, the user can save labor.

Figure 10:
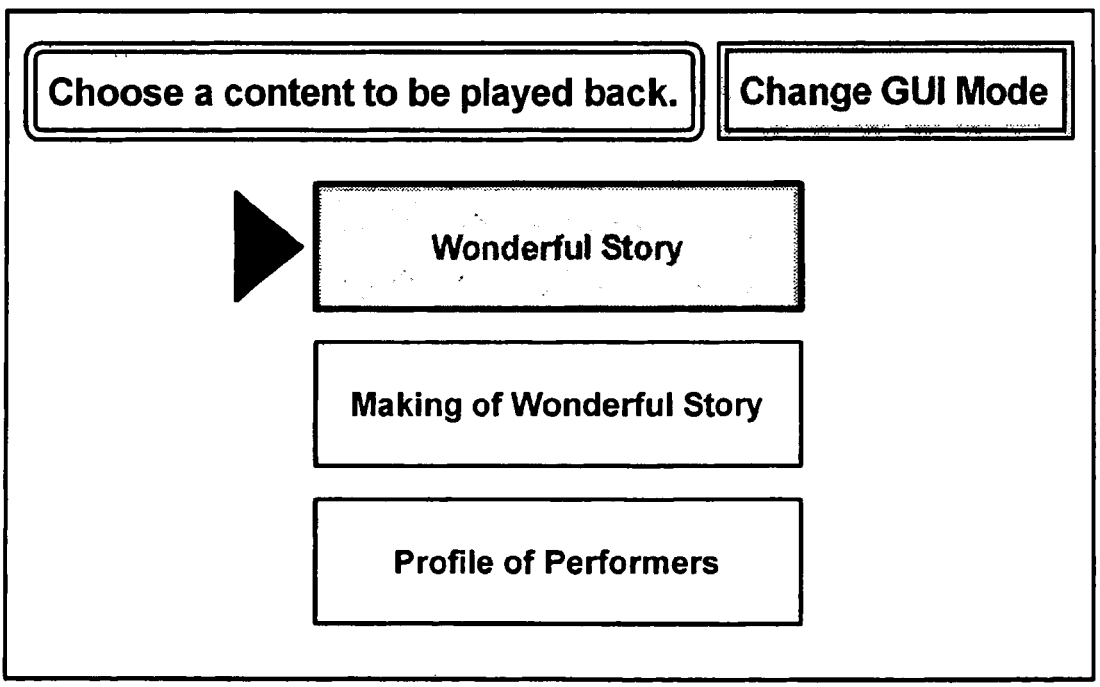
FIG. 10 illustrates an example of a playback menu window where GUI is not used.

Here, an example will be taken for a case where a newly purchased optical disk is set to the recording and playback apparatus. Since the disk is a newly purchased disk, no information on the optical disk is written in the GUI environment setting information file which is stored in the memory 114. Taking the above into consideration, system configuration information, or configuration information for each scene or for each person out of information written in the GUI environment setting information file will be referred to, and GUI display will be executed based on such information. In this case, it shall be assumed that the GUI mode on the playback menu is set to the above-described Mode A, or more specifically, the mode in which GUI functions are most enriched. At this time, when the user is going to set the GUI display of the disk to the above-described Mode B, it is very troublesome to move all the way over to the system menu for achieving the setting. In this connection, with the embodiment, a button is provided on the playback menu to switch over the GUI mode. For example, GUI display is arranged in FIG. 3, and, to switch over the GUI display, what is needed is to click the "Change GUI Mode" button located at the upper right part of the window. At this time, the expanded function control unit is configured to change the GUI display setting and switch over the display as well as to update the content of the GUI environment setting information file. It should be noted that FIG. 10 shows an example for a case where the GUI display on the playback window shown in FIG. 3 is switched over to the above-described Mode B, or more specifically, a simple display wherein part of GUI functions is omitted.

With such configuration, it is possible for a user to change GUI setting with easy operations from the playback menu. In addition, the method of changing GUI setting from the playback menu is not limited to such method stated in the above. For example, by configuring the main unit or the remote control unit of the recording and playback apparatus to have a "Change GUI Mode" button, it is possible to change the GUI setting with very simple operations of just clicking the button.

It can be configured that the GUI environment setting information file that is created and recorded in the above-described procedures is read when turning on the apparatus, replacing the optical disk, or completing an authorization process such as entry of a user ID or a password, and GUI functions are displayed based on the information thus read. Further, when a change is made to GUI setting on the system menu or the playback menu, the changed content will be automatically updated. Alternatively, the user may have an option to choose whether the changed content will be updated or not.

As described in the above, by recording the GUI environment setting information file in advance, referring to the content of the file, and reading the setting, a user can handle the recording and playback apparatus according to the embodiment under the user's preferred GUI environment at all times, thus offering advantageous effect on usability.

It should be noted that the example described herein only shows an example of the embodiment. Consequently, content to be recorded in the GUI environment setting information file, storage-destination of file, timing of read or update, etc. are not limited to the example, and various variants are possible.

Next, a process at the time of network connection of the expanded function control unit 113 will be described hereunder. The network connection function in a recording and playback apparatus is less common, but in the future, it is expected a service will be initiated in which a user downloads new content offered by a content provider via a network from a specified file server and records the downloaded content on an empty optical disk.

Hereinafter, a process to download content via a network will be described.

Referring to FIG. 1, upon receiving an instruction to download content from a user, the expanded function control unit 113 executes the menu display program 202 which is recorded on the optical disk 101 and initiates a download process. Specifically, connection is made to a specified file server on the network via the network connection unit 115. At this time, the location of the file server is specified on the network by use of identification information called Universal Resource Locator (URL). The URL may be stated in the program to execute downloading, or it may be stated in a specified file on the optical disk.

Thereafter, the file server and the recording and playback apparatus execute a process to authorize each other. When the authorization is completed, transmission of the specified content is initiated from the file server to the recording and playback apparatus. The recording and playback apparatus stores the transmitted content in a sequential order in the memory 114. At this time, it could be assumed that downloading may not be completed in one session if the information amount of the content is too large. The system control unit 111 is configured to monitor the information amount stored in the memory 114, and write the information on the optical disk 101 only when the information amount reached a certain level.

It has been already described that such downloading process of content as stated above is incorporated in the menu display program 202 on the optical disk. However, the process is not limited thereto, and the program may be installed in advance in a ROM in the system control unit, for example. What matters here are virus infections that occur via networks or programs. Execution of a network connection or a program is always in a danger of virus infection. In particular, as for the class of users of recording and playback apparatuses, since those who have adequate knowledge on computer virus are very limited, unlike the class of users of Personal Computers (PCs), they are at higher risk of virus infection through network connections.

In this connection, the embodiment is configured such that even those users who do not have knowledge on computer virus can improve security level and reduce risks of virus infection with simple operations. First, a method of setting the security level will be described hereunder. The security level setting implies to set a method of classifying a plurality of programs to execute a certain process into a level that executes the program and a level that does not execute the program. For example, a program that is executed when downloading content is of course a download process execution program. However, other than the program, sub-programs that are different from the primary object, including a program for executing a window to display the progress of downloading or animation, may sometimes be executed.

In this connection, allowing the user to set security levels is convenient. For example, the user is allowed to choose high or low security level and set the level from a security level setup window shown in FIG. 11. Regarding the definition of high and low security levels in this case, since, in principle, it is an object to reduce the risk of virus infection when the security level is set to a high level, execution of a sub-program is more tightly restricted so as not to execute other programs than the primary object. In addition, when the security level is set to a low level, execution of a sub-program is less tightly restricted to allow execution of programs even if they are not of the primary object. Restrictions on execution of sub-programs, for example, may be imposed within a range where all sub-programs will not be executed when the security level is set to the highest level, and all sub-programs will be executed when the security level is set to the lowest level.

Here, when the security level is changed, a judgment is made as to which program should be executed and which program should not be executed in the expanded function control unit 113. For example, to disable execution of a program to display a window, when a command to display the window is found in the program, the expanded function control unit 113 will not execute the command. In this case, setting of which command should be executed and which command should not be executed can be easily realized with the program in the expanded function control unit 113.

Figure 11:
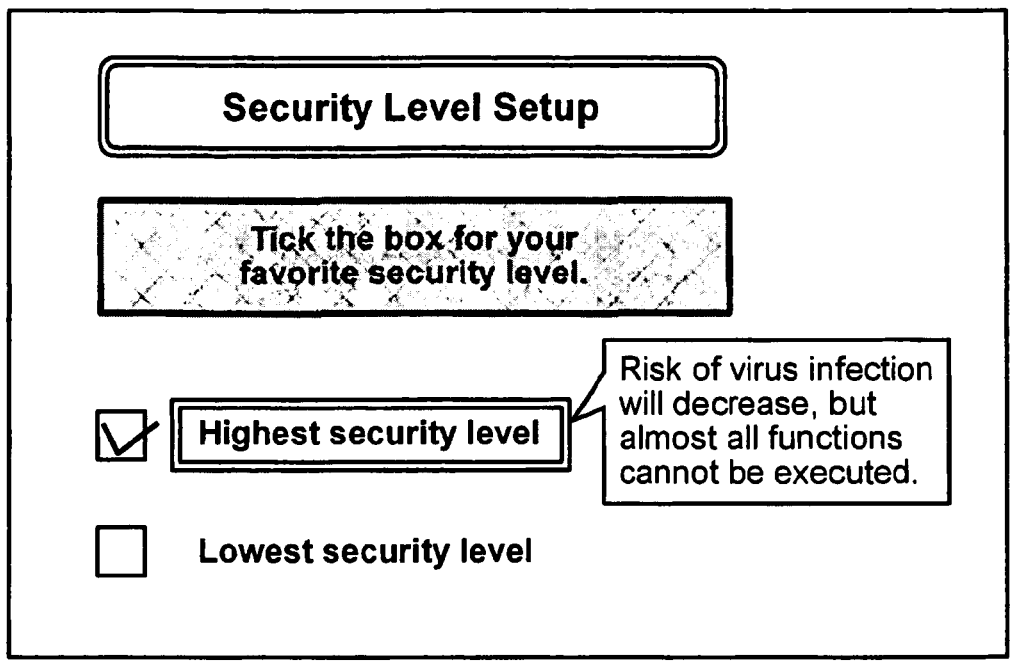
FIG. 11 illustrates an example of a security level setting window.

In the embodiment, an extreme example for the highest and the lowest security levels is described as shown in FIG. 11. However, setting of security levels is not limited to the two levels, and the level can be further sub-divided. For the security level at this time, various examples of variants are possible, including an arrangement wherein default values may be set in the recording and playback apparatus in advance, and a configuration which enables the user to customize the level.

Such security level setting may be configured to be performed from the system menu window, or may be configured such that a window as shown in FIG. 11 is ensured to be displayed before establishing a connection to a network to enable setting on a case-by-case basis. Further, only specified users of the recording and playback apparatus may change the setting. It is all the better that the specified users have abundant knowledge about network. In addition, to make operations further simpler, a "Security High/Low" button is provided to the main unit or the remote control unit of the recording and playback apparatus, for example, whereby it is possible to change the security level setting with a very simple operation to press the button. At this time, what is particularly effective is provision of a button to increase the security level. This is because an object of the embodiment is to enable every user to increase the security level with simple operations and to reduce the risk of virus infection.

Figure 12:
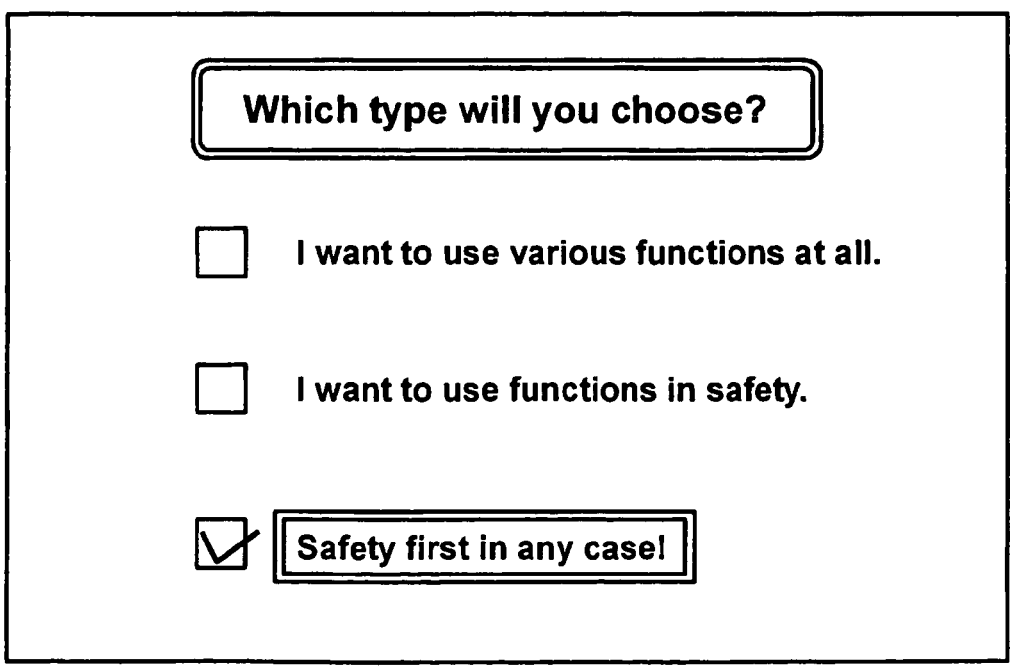
FIG. 12 is an example of a security level setting window where no technical term is used.

Furthermore, when changing the security level setting, or when decreasing the security level in particular, a warning on virus infection is issued to the user. For example, as shown in FIG. 11, issuance of a warning in which the security level and virus infection are associated with each other will bring about an effect to make users aware that connection to a network carries a risk and bolster the image that excessively decreasing the security level is dangerous. In addition, as an alternative method of obtaining a similar effect, a message to recommend increasing the security level may be displayed. Furthermore, when technical terms such as the security level are used, it is difficult to make some users to understand them, expressions, as shown in FIG. 12, which are familiar to users may be used.

As stated in the above, the embodiment is configured to provide various functions to reduce risks such as virus infection. To further improve the effect, it is recommended to set the default security level setting to the highest level. With this setting, an effect can be obtained which reduces risks of virus infection, etc. to be the lowest even when the user failed to set the security level.

In addition, for a case where a network connection is made to a WEB site to which a user accessed in the past and did not cause any problems such as virus infection, even when the user made a change to lower the security level, a warning as describe earlier is not issued. An variation example like this configuration further improves usability.

An example of a module to realize the variation example will be described hereunder. First, on the assumption, when executing a network connection, the expanded function control unit 113 stores URLs of sites previously connected and the number of connections thereto, and further, security levels of past connections as well as information as to whether any problems occurred or not in the past, etc. in the memory 114.

Figure 13:
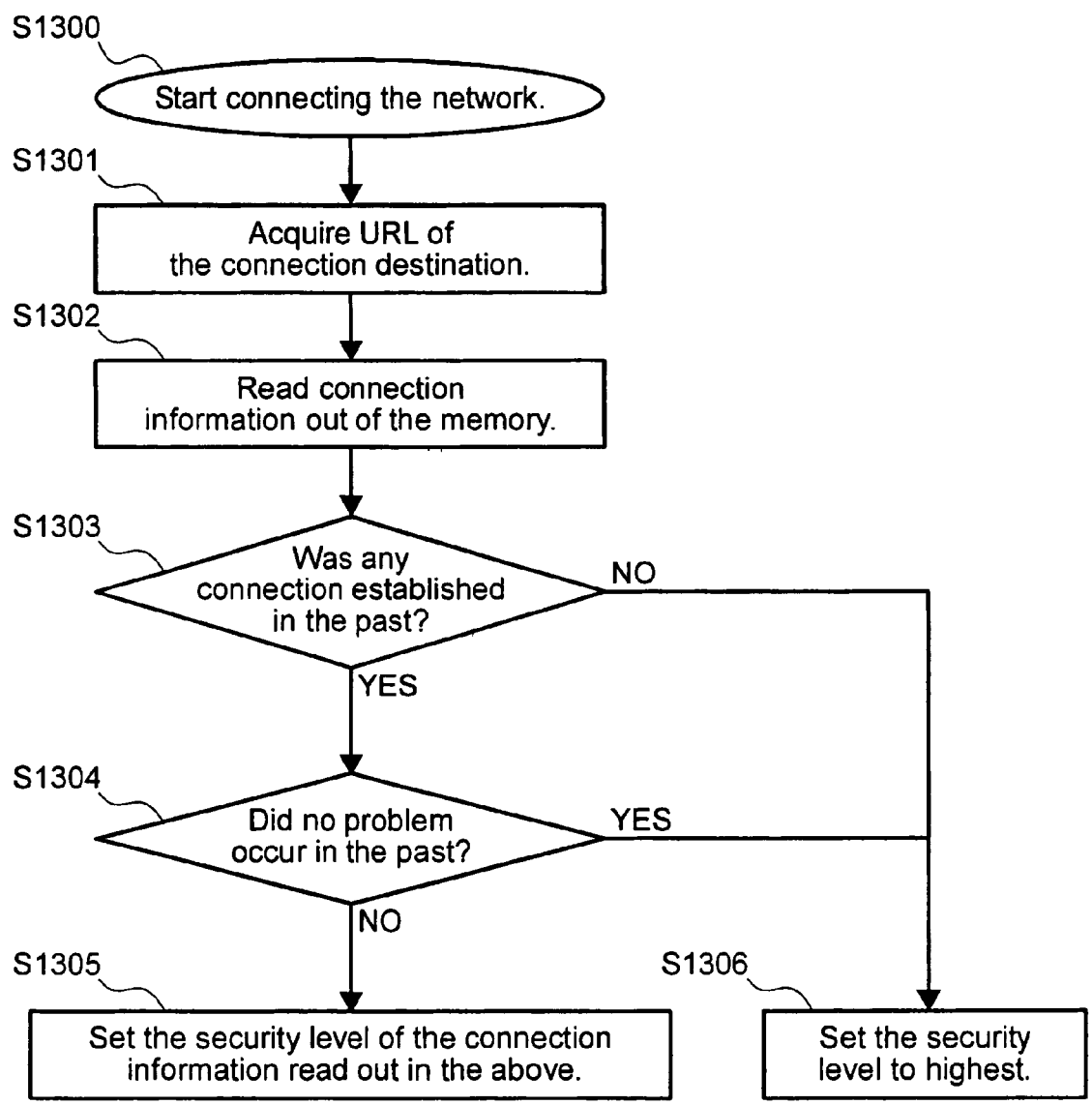
FIG. 13 is a flow chart of network connection starting process.

FIG. 13 shows a process flow of the expanded function control unit 113 when a network connection is initiated. The expanded function control unit 113, upon receiving an instruction of network connection from a user, initiates a network connection process in Step S1300. Next, in Step S1301, the expanded function control unit 113, after receiving the designation of the URL of the site to be connected from the user, reads connection information stored in the memory 114 in step S1302.

In Step S1303, the expanded function control unit 113 analyzes the connection information thus read and checks the past connection records to the designated URL. If any connection records are available, the unit 113 advance the process to Step S1304, analyzes the connection information thus read in more depth, and checks for any problems including virus infection when connections were made to URLs designated in the past. As a result, if no problem occurred in the past, the unit 113 advances the process to Step S1305 and sets the security level to the level that is written in the connection information read in the above. On the other hand, if the checks made in Step S1303 and Step S1304 revealed no connection record or existence of a problem in the past, the unit 113 advances the process to Step S1306 and sets the security level to the highest level.

With such configuration, it is possible to bring about an effect that the user, when accessing the site that was already connected in the past, can save labor to reset the security level for each connection, and can browse the site under the same conditions as the past browsing of the site. The configuration brings about a particular effect when the user frequently establishes connection to a specified site. In addition, when connecting to a site for the first time or to a site with which the user experienced a problem, it is possible to obtain an effect that it is easy to avoid virus infection by automatically setting the security level to the higher level.

As described in the above, since the recording and playback apparatus according to the embodiment is configured to provide the execution environment of general-purpose software represented by JAVA and execute a JAVA program on an optical disk or a network, it is possible to realize sophisticated expanded functions. Further, a user can switch over execution conditions of the JAVA program with easy operations and can set up GUI functions and security levels to his or her favorite environment. It should be noted that the expanded functions shall not be limited to GUI functions or network connections, but they shall include other functions, including games, that can be executed by JAVA software.

While we have shown and described several embodiments in accordance with our invention, it should be understood that disclosed embodiments are susceptible of changes and modifications without departing from the scope of the invention and that such changes and modifications fall within the ambit of the appended claims.

What is claimed is:

1. A disk recording and playback apparatus configured with an interface for connection to a display module, comprising:
   a read module to read audio and video information recorded on a disk;
   an output module to display said audio and video information on said display module;
   a control module to display a selection window on said display module showing a plurality of extended functions, said control module operative to receive a user-selected selection of one of said expanded functions; and
   storage to store configuration information indicative of a selection of one or more of said expanded functions, wherein said control module is further operative to display said operation windows based on said configuration information,
   said control module further operative to display a plurality of graphics windows to said user based on said user-selection of said expanded functions via said output module, said graphics windows used by said user to operate said disk recording and playback apparatus,
   wherein said expanded functions comprise a plurality of user interfaces, said selection window includes a selection indicator displayed therein and a plurality of first graphic elements displayed therein, each first graphic element representing one of said user interfaces, wherein selection of a user interface can be made by manipulating said selection indicator to select one of said first graphic elements.

2. The apparatus of claim 1 wherein each user among plural users is associated with configuration information for that user.

3. The apparatus of claim 1 wherein said configuration information includes information relating to whether a graphical user interface is displayed, shows a configuration of a scene selection window, and shows a list of users, wherein each user can have its own configuration information.

4. The apparatus of claim 1 wherein said configuration information further includes information for one or more disks, wherein each disk can have configuration information associated with it.

5. A disk recording and playback apparatus connectable with a display module, comprising:
   a read module to read information from a disk on which audio and video information is recorded and a plurality of display programs are recorded;
   an interface control module operative to:
   display a first graphic associated with determining whether or not to use graphical user interfaces (GUIs) for all interactions with a user;
   display a second graphic associated with determining whether or not to use GUIs for interaction with said user in connection with performing playback functions of content stored on the disk;
   receive an enable or disable selection in connection with said first graphic, wherein said enable selection will cause GUIs to be displayed for all interactions with said user, wherein said disable selection will disable displaying of GUIs for all interactions with said user;
   receive an enable or disable selection in connection with said second graphic, wherein said enable selection will cause GUIs to be displayed for interactions with said user in connection with said playback functions, wherein said disable selection will disable displaying of GUIs in connection with said playback functions.

6. The apparatus of claim 5 wherein said GUIs are predefined GUIs stored on said disk.

7. The apparatus of claim 5 wherein each of said GUIs comprises graphical elements representative of control functions to control said disk recording and playback apparatus.

8. The apparatus of claim 5 further comprises storage to store configuration comprising one or more of said enable or disable selection in connection with said first graphic or said enable or disable selection in connection with said second graphic.

9. The apparatus of claim 8 being a DVD player.

10. The apparatus of claim 8 wherein said configuration information is further associated with a disk to be played back by said apparatus.

11. The apparatus of claim 5 wherein at least one of said display programs is a JAVA™ program.

12. The apparatus of claim 5, further comprising:

a network connection module; and a recording module to record history information on WEB sites to which connections are made with said network connection module, wherein a security level is set based on said history information recorded by said recording module.

13. The apparatus of claim 12 wherein said security is set to a first level on determining that a problem occurred in the past, and a second security level is set on occurrence of an absence of problems for a predetermined length of time.

14. The apparatus of claim 12 wherein said first level represents a higher degree of security than said second level.

* * * * *

UNITED STATES PATENT AND TRADEMARK OFFICE
CERTIFICATE OF CORRECTION

PATENT NO. : 7,697,824 B2  Page 1 of 1
APPLICATION NO. : 11/056435
DATED : April 13, 2010
INVENTOR(S) : Nozomu Shimoda et al.

It is certified that error appears in the above-identified patent and that said Letters Patent is hereby corrected as shown below:

Cover Page:

At (75) Inventors:

"Nozomu Shimoda, Ninimiya (JP)"

should read,

-- Nozomu Shimoda, Ninomiya (JP) --

Please add:
-- (30)   Foreign Application Priority Data,
   May 7, 2004   (JP)   ............ 2004-138006 --

Signed and Sealed this

Seventeenth Day of August, 2010

David J. Kappos
*Director of the United States Patent and Trademark Office*